United States Patent
Hunter

[15] 3,703,263
[45] Nov. 21, 1972

[54] CORD TENSIONING DEVICE
[72] Inventor: Edward E. Hunter, Akron, Ohio
[73] Assignee: The Goodyear Tire & Rubber Company, Akron, Ohio
[22] Filed: April 26, 1971
[21] Appl. No.: 137,304

[52] U.S. Cl. .............................. 242/129.8, 242/156
[51] Int. Cl. .............................................. B65h 49/00
[58] Field of Search ................. 242/129.8, 156, 156.2

[56] References Cited

FOREIGN PATENTS OR APPLICATIONS 364,717   5/1941   France ................. 242/DIG. 1

Primary Examiner—Leonard D. Christian
Attorney—F. W. Brunner and Michael L. Gill

[57] ABSTRACT

A cord tensioning let-off device having a spindle inclined to the horizontal, a brake member fixed at the lower end of the spindle and a floating armature disposed about the spindle adjacent the brake member and keyed to a spool of cord. Gravity draws the armature into frictional engagement with the brake member and is assisted by an electro-magnet associated with the device.

21 Claims, 3 Drawing Figures

PATENTED NOV 21 1972

INVENTOR.
EDWARD E. HUNTER
BY
Michael L. Gill
ATTORNEY

CORD TENSIONING DEVICE

The foregoing abstract is not to be taken as limiting the invention of this application, and in order to understand the full nature and extent of the technical disclosure of this application, reference must be made to the accompanying drawings and the following detailed description.

This invention relates to an apparatus for letting strand material off a spool under tension, and in particular to such an apparatus for use in letting high modulus cords for use in reinforcing elastomeric or rubber articles has been significantly increased. This is particularly true with the introduction of wire cords for use in reinforcing tires and other rubber articles.

This increase in modulus of elasticity is the apparent cause of recent problems in tension let-off mechanisms for letting cord off spools for processing. Current magnetic brake type let-off mechanisms have not been capable of maintaining a smooth constant tension on the wire or other such high modulus cords. The brake shoe, or magnetic brake, tends to chatter or vibrate causing irregular tension in the cords and occasionally a complete loss of tension. Present mechanical type brake systems are inadequate inasmuch as they require individual adjustment of each let-off mechanism in order to maintain a fairly constant cord tension as the cord is let off the spool and the torque arm of the cord on the spool is decreased.

It is an object of this invention to provide a mechanism for letting high modulus cords off a spool under a uniform tension. It is a further object of this invention to provide such a mechanism which can maintain a substantially uniform tension on the cord as the cord is let off the spool.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
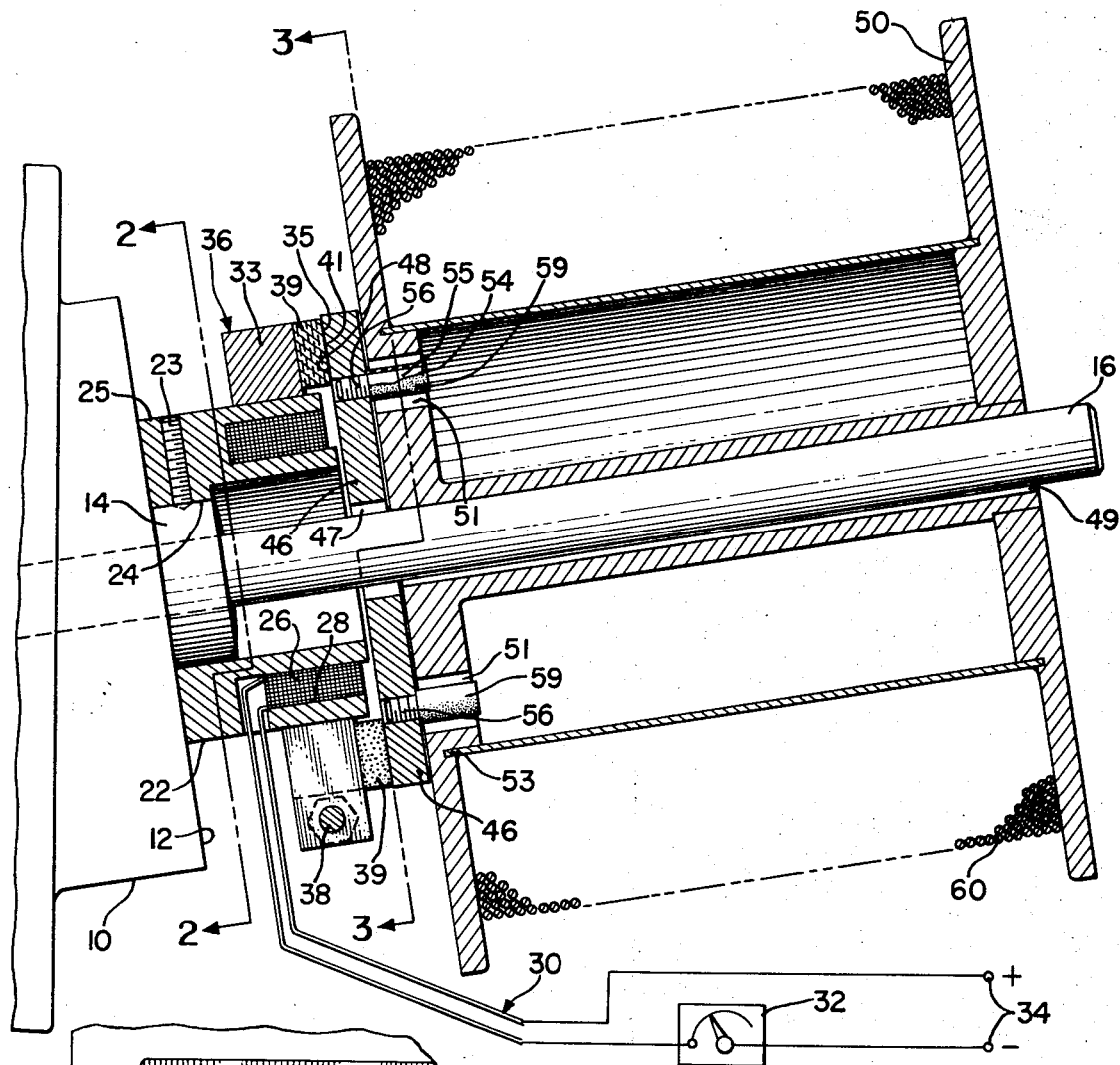
FIG. 1 is a cross-sectional elevational view of an apparatus constructed in accordance with this invention.
Figure 2:
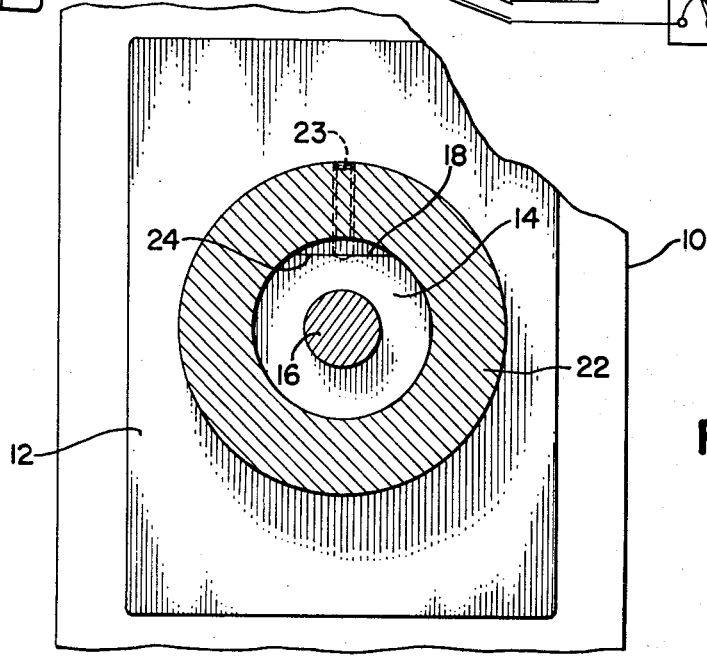
FIG. 2 is a fragmentary sectional view of the apparatus of FIG. 1 taken substantially along line 2—2 of FIG. 1.

With reference to the drawings and in particular FIG. 1, an apparatus or device constructed in accordance with this invention includes a base 10 which may be mounted on a suitable frame (not shown) along with several other such devices. In the particular embodiment illustrated, the base 10, when so mounted on a suitable frame, has a generally planar surface 12 which is disposed at an angle of about 80 degrees with respect to the horizontal. A boss 14 extends perpendicularly outwardly from the planar surface 12 and is located generally centrally thereof. A shaft or spindle 16 extends from the base 10 coaxially through the boss 14 and is perpendicular to the surface 12. The spindle 16 is rigidly fixed to the base 10 and being perpendicular to the surface 12 is thus disposed at an angle of approximately 10 degrees to the horizontal. As best seen in FIG. 2, the boss 14 is generally circular with a flat side 18 which is generally perpendicular to the surface 12.

With reference to FIGS. 1 and 2, a generally cylindrically shaped housing 22 is received over the spindle 16 and disposed adjacent to the base 10. The radially inner surface 24 of the housing 22 at the end 25 adjacent the base 10 is shaped to conform to and is received over the boss 14. The housing 22, therefore, when received over the boss 14 will not rotate about the longitudinal axis of the spindle 16. The housing 22 is fixed on the boss 14 by means of a set screw 23 extending through the wall of the housing 22 and in engagement with the boss 14. An electro-magnet 26 is mounted in an annular recess 28 extending from the end 29 of the housing 22 opposite the base 10. Electrical circuitry, generally illustrated at 30, is connected to the electromagnet 26 and includes a power source 34 and a rheostat 32 for supplying current to the electro-magnet 26 and varying the current to vary the pulling force of the electro-magnet 26.

Figure 3:
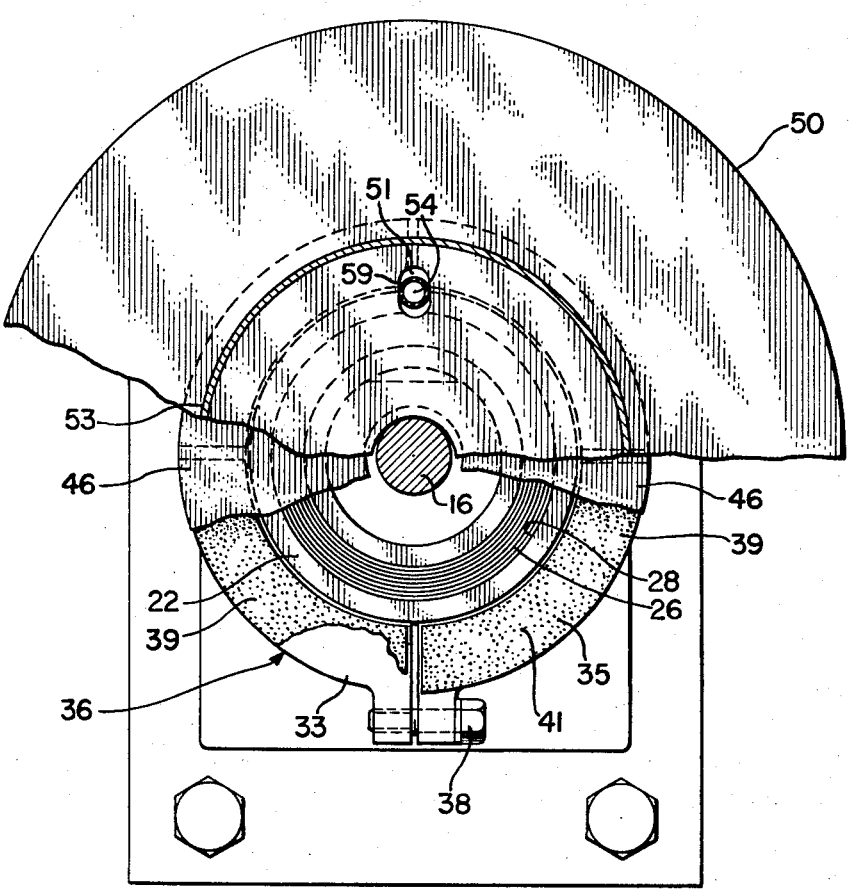
FIG. 3 is a fragmentary sectional view of the apparatus of FIG. 1 taken substantially along line 3—3 of FIG. 1.

As best seen in FIGS. 1 and 3, an annular brake member, generally illustrated at 36, is disposed about and fixed to the housing 22. The brake member 36 includes a split ring 33 with a clamping bolt 38 for tightly clamping the brake member 36 to the housing 22. Annular brake linings 39 are adhered or fixed to the annular ring 33 by suitable means such as glue or rivets. The surfaces 35 of the brake linings 39 opposite the split ring 33 form a planar surface 41 which is perpendicular to the longitudinal axis of the spindle 16. The fixed position of the brake member 36 along the axis of the spindle 16 can be adjusted by loosening the clamping bolt 38 and moving the clamping ring 33 axially along the outer surface of the housing 22. A generally disc-like armature 46 with a central throughbore 47 is disposed about the spindle 16 and is provided with a planar surface 48 which is disposed adjacent the planar surface 41 of the brake linings 39 for frictional engagement therewith. The armature 46 is made of cast iron or other suitable material such that it can be drawn toward the brake member 36 by the force of the electro-magnet 26. The throughbore 47 is larger in diameter than the spindle 16 to permit the armature 46 to seek the magnetic center of the electro-magnet 26. This large throughbore 47 also permits slight angular movement of the planar surface 48 relative to the longitudinal axis of the spindle to assure alignment of the planar surfaces 41 and 48 of the brake linings 39 and armature 46, respectively, and complete frictional contact between these surfaces. It will be appreciated, also, that the armature 46 is free to float or move axially along the spindle 16.

A spool 50 is provided with a coaxial throughbore 49 and is received over the spindle 16 for rotation about the longitudinal axis of both the spool and the spindle. The throughbore 49 is slightly larger than the diameter of the spindle to permit free rotation of the spool. A pair of radially extending slots 51 are disposed in the end 53 of the spool 50 adjacent the armature 46 for receiving a pair of pins 54 extending from the armature 46 and parallel to the longitudinal axis of the spindle 16. The pins 54 are fixed in the armature 46 by suitable means such as threads 56. These pins 54, therefore, provide means for preventing relative rotational movement between the armature 46 and the spool 50 about the spindle 16. The armature 46 and spool 50 are thus connected for rotation in unison about the longitudinal axis of the spindle 16. The slots 51, however, permit relative radial movement between the armature 46 and the spool 15 relative to the longitudinal axis of the spindle 16. This is necessary because of the clearance between the spindle 16 and the throughbore 49 permits a certain amount of radial movement of the spool 50 relative to the spindle 16 and the clearance between the armature 46 and spindle 16, permits the armature 46 to seek its magnetic center with respect to the electromagnet 26. These radial movements vary and are not always equal and provision must be made for relative radial movement between the spool 50 and armature 46 relative to the spindle 16. Damping means are provided to prevent excessive vibration and shock loading to be transmitted between the spool 50 and the armature 46. The particular damping means illustrated includes an annular elastomeric sleeve 59 disposed about the end 55 of the pin 54 which extends into the slot 52 in the spool 50. The damping means may also include the use of plastic or some other material less rigid than steel for the pins 54. The sleeve 59 may be coated on its radially outer periphery with a suitable material to allow free sliding of the pin in radial directions in the slot 51.

In the use of the mechanism a spool 50 of wire or cord is slipped over the spindle 16 and rotated thereabout until the pins 54 are slipped into the radial slots 51. Since the spindle 16 is sloped with respect to the horizontal and the brake member 16 is sloped with respect to the horizontal and the brake member 36 is at a lower elevation than the spool 50 and armature 46, gravity will urge the spool 50 and armature 46 toward the brake member 36 and cause frictional engagement between the planar surfaces 41 and 48, respectively, of the brake member 36 and armature 46. The cord 60 is drawn off of the spool and into a cord processing unit (not shown). Electrical current is applied to the electro-magnet to force the planar surfaces 41 and 48 into tighter frictional contact. As the cord or wire 60 is let off of the spool 50 the weight of the spool decreases and the torque arm of the cord pulling on the spool decreases, thus resulting in a change in tension in the cord. The tension can then be adjusted by adjusting the rheostat 32 and the current flowing to the electro-magnet 26 and thus the frictional force developed between the surfaces 41 and 48. An increase in current to the electromagnet 26 will increase the magnetic force of the electromagnet 26 drawing the armature 46 toward the brake member 36. Conversely, a decrease in current to the electro-magnet 26 will decrease this force. It will be appreciated that a single rheostat can be utilized to adjust the current flow to many cord let-off mechanisms, thus eliminating the necessity of individual adjustment of the let-off mechanisms as required in current mechanical cord let-off mechanisms.

While in the particular embodiment illustrated, the spindle 16 is fixed in the base 10, it will be appreciated by those skilled in the art that the spindle 16 could be mounted on bearings in the base 10 and the spool 50 clamped or fixed to the spindle 16. Further, while in the particular embodiment illustrated, the housing 22 and thus the electromagnet and brake 28 are fixed to the boss 14 by means of a set screw 23, they may be merely registered on the boss to prevent rotation about the spindle 16 but free to move in axial directions. It will also be appreciated that while the brake linings 39 are adhered to the annular ring 33 that these brake linings 39 may also be adhered to the armature 46 and in frictional engagement with the rings 33. In the particular embodiment illustrated, the pins 54 are fixed in the armature 46, it is also possible that the pins 54 could be fixed in the spool and received in radial extended slots in the armature 46 similar to the slots 51 in the spool 50. Also, while it is preferred that the mechanical means for urging the armature toward the brake member comprises a means for disposing the spindle at an angle such that gravity urges the spool and armature toward the brake, it will be appreciated that other mechanical means might be utilized such as a spring mounted on the spindle and urging the armature toward the brake member.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for holding a spool of cord and tensioning the cord as it is let off the spool comprising: a base, a spindle extending from the base for carrying said spool for rotation about the longitudinal axis of the spindle, an armature movable axially on said spindle, a brake member in fixed position relative to rotation about the longitudinal axis of said spindle for frictionally engaging said armature, means connecting the armature to the spool for rotation in unison about the longitudinal axis of the spindle, mechanical means for urging said armature along said spindle toward said brake member, and an electro-magnet associated with the apparatus for attracting the armature into tighter frictional engagement with the brake member.

2. An apparatus as claimed in claim 1, wherein the armature and brake member have mating planar surfaces for contacting relationship and the mating planar surface of the brake member lies in a plane normal to the axis of the spindle.

3. An apparatus as claimed in claim 2, which includes means for allowing slight angular movement of the surface of the armature relative to the longitudinal axis of the spindle such that said mating planar surfaces will be parallel for complete contacting relationship.

4. An apparatus as claimed in claim 1, further including means for permitting slight relative movement between said armature and said spool in general radial directions with respect to said spindle.

5. An apparatus as claimed in claim 1, wherein said brake member is fixed in axial directions with respect to said spindle.

6. An apparatus as claimed in claim 1, wherein said mechanical means comprises means for mounting said spindle such that the force of gravity draws said armature toward said brake member.

7. An apparatus as claimed in claim 1, further including means for reducing vibrations and shock loads transmitted between said armature and said spool.

8. An apparatus as claimed in claim 4, wherein said means for fixing the angular position about said spindle of said armature relative to said spool comprises a pin extending parallel to said spindle and engaging both said armature and said spindle.

9. An apparatus as claimed in claim 8, wherein said means for providing relative movement between said armature and said spool comprises a radially extending slot in either said armature or said spool for receiving one end of said pin.

10. An apparatus as claimed in claim 9, further including means for reducing vibrations and shock loads transmitted between said armature and said spool.

11. An apparatus as claimed in claim 10, wherein said spindle is fixed relative to said base and said spool is rotatable about said spindle.

12. An apparatus as claimed in claim 11, which includes a rheostat disposed in electrical circuitry with the electromagnet for varying the current received by the electromagnet to maintain a predetermined uniform tension on the tire cord as it leaves the spool.

13. An apparatus as claimed in claim 12, wherein said electro-magnet is fixed relative to said base.

14. An apparatus as claimed in claim 13, further including means for fixing said brake member in a plurality of positions along the longitudinal axis of said spindle.

15. An apparatus as claimed in claim 14, wherein said means for reducing vibrations and shock loads comprises a resilient sleeve disposed about said pin.

16. An apparatus as claimed in claim 15, wherein said armature and said brake member have mating planar surfaces for frictional contacting relationship, the mating planar surface of the brake shoe lies in a plane normal to the axis of the spindle, and further including means for allowing slight angular movement of the surface of the armature relative to the longitudinal axis of the spindle such that the mating planar surfaces will be parallel for complete contacting relationship.

17. An apparatus as claimed in claim 1, wherein said brake is fixed in axial directions with respect to said spindle and said mechanical means comprises means for mounting said spindle such that the force of gravity draws said armature and said spool toward said brake member.

18. An apparatus for holding a spool of cord and tensioning the cord as it is let off the spool comprising; a base, a spindle extending from the base for carrying said spool for rotation about the longitudinal axis of the spindle, an armature movable axially on said spindle, a brake member in fixed position relative to rotation about the longitudinal axis of said spindle, said armature and brake member having mating planar surfaces for contacting relationship with the mating planar surfaces lying in a plane normal to the axis of the spindle, means connecting the armature to the spool for rotation in unison about the longitudinal axis of the spindle, means for allowing slight angular movement of the surface of the armature relative to the longitudinal axis of the spindle such that said mating planar surfaces will be parallel for complete contacting relationship, and an electro-magnet associated with the apparatus for attracting the armature in an axial direction with respect to said spindle and toward said brake member.

19. An apparatus as claimed in claim 18, further including means for permitting slight relative movement between said armature and said spool in general radial directions with respect to said spindle.

20. An apparatus as claimed in claim 19, further including means for reducing vibrations and shock loads transmitted between said armature and said spool.

21. An apparatus as claimed in claim 19, wherein said brake member is fixed in axial directions with respect to said spindle.

* * * * *